(12) United States Patent
Cochran

(10) Patent No.: US 6,345,273 B1
(45) Date of Patent: Feb. 5, 2002

(54) SEARCH SYSTEM HAVING USER-INTERFACE FOR SEARCHING ONLINE INFORMATION

(76) Inventor: Nancy P. Cochran, 52 Gedney St., Nyack, NY (US) 10960

( * ) Notice: Subject to any disclaimer, the term of this patent is extended or adjusted under 35 U.S.C. 154(b) by 0 days.

(21) Appl. No.: 09/427,737
(22) Filed: Oct. 27, 1999
(51) Int. Cl.[7] ............................................. G06F 17/30
(52) U.S. Cl. ............................. 707/4; 707/3; 707/6
(58) Field of Search ................................. 707/3, 5, 100, 707/104, 4, 6; 345/353, 348, 347, 352, 356; 705/2; 395/352

(56) References Cited

U.S. PATENT DOCUMENTS

| | | | | |
|---|---|---|---|---|
| 5,500,936 A | * | 3/1996 | Allen et al. | 345/348 |
| 5,781,904 A | * | 7/1998 | Oren et al. | 707/100 |
| 5,805,164 A | * | 9/1998 | Blum et al. | 345/347 |
| 5,805,167 A | * | 9/1998 | Van Cruyningen | 345/353 |
| 5,828,376 A | * | 10/1998 | Solimene et al. | 395/352 |
| 5,907,704 A | * | 5/1999 | Gudmundson et al. | 717/1 |
| 5,912,667 A | * | 6/1999 | Chang | 345/347 |
| 5,913,208 A | * | 6/1999 | Brown et al. | 707/3 |
| 5,915,240 A | * | 6/1999 | Karpf | 705/2 |
| 5,959,629 A | * | 9/1999 | Masui | 345/347 |
| 5,982,370 A | * | 11/1999 | Kamper | 345/356 |
| 6,012,055 A | * | 1/2000 | Campbell et al. | 707/5 |
| 6,038,560 A | * | 3/2000 | Wical | 707/5 |
| 6,070,158 A | * | 5/2000 | Kirsch et al. | 707/3 |

* cited by examiner

*Primary Examiner*—Thomas Black
*Assistant Examiner*—Thuy Pardo
(74) *Attorney, Agent, or Firm*—Blank Rome Comisky & McCauley LLP (57) ABSTRACT

A system for facilitating the searching of data from an electronic data source. The invention teaches a method for presenting a large number of search terms rapidly and efficiently to a user. Users may scan a large number of search terms, move quickly from one search category to another, select a search term with minimal mechanical input and generate a series of "hits" that meet their search goals. The need to guide the computer with mechanical actions from a keyboard, mouse or other device is minimized. Graphics that distract the user from any task other than selecting hits are eliminated. Users are able to scan quickly and find electronic information with minimum effort.

32 Claims, 9 Drawing Sheets

SEARCH SYSTEM HAVING USER-INTERFACE FOR SEARCHING ONLINE INFORMATION

BACKGROUND OF THE INVENTION

Information is available in quantities significantly larger than has ever been known in human history. For example, EXCITE, one popular search engine on the World Wide Web, now claims to routinely examine and index 250 million pages of online information and to consider another 500 million pages for possible inclusion in the EXCITE search system. Information is also available to more people than ever before in human history. The use of electronic information has increased more than a thousand fold since 1990.

Interface technology that assists searchers in locating target information from all available information is still evolving. One popular method for finding information online is a Key Word search. A user types a word or words in a search box provided for this purpose. The word(s) typed are used to search all available documents and return "hits" to the user. Most modern online electronic search engines, including well known search sites such as ALTAVISTA and LYCOS, include Key Word searching.

A second popular method for finding information is by presenting a Directory. Typically, Directory searching involves presenting a list of categories. The user selects from among the choices that are displayed. Additional, more specific, search terms are then presented and selected by the user. The search process is organized hierarchically so that a selection from one category leads to a set of other choices contained within that category. A user moves down the "branches" of the directory "tree" until they find the information they want. YAHOO and MICROSOFT NETWORK are examples of the many publicly available electronic search engines that provide Directory listings.

Cochran describes non-hierarchical searching in U.S. Pat. No. 5,768,581, which is herein incorporated by reference. Instead of moving down a Directory tree, a user selects search terms from several search categories that are not organized in a branching tree structure. Selecting from one category does not eliminate the possibility of selecting from other categories because categories are mutually exclusive, unlike Directory searching.

Cochran et al., in U.S. Pat. Nos. 4,879,648 and 5,206,949 herein incorporated by reference, describe two distinct ways of developing lists of search terms. Static lists are developed "logically" from what is already known about how information is organized and used. Static lists are constructed from theory and/or the expected use of the information and are prepared in advance of use of the lists. Static lists do not require a search through the information source, and remain the same unless a list of terms in the program itself is edited. For instance, a static list may be an alphabetical list of city names in a company's service area. It is relatively unchanging and can be constructed by management personnel in advance of any search.

Dynamic lists, on the other hand, are developed by an active search of the information under consideration. Dynamic lists vary over time as the information source changes, and may change frequently. For instance, a dynamic list may be an alphabetical list of the names of people who have enrolled in an online promotion. The list changes from minute to minute as people sign up. The Cochran patents describe one way of constructing static and dynamic lists.

All online information search systems that display selectable is search terms are relatively slow. It often takes more than a minute to select multiple search terms from a Directory or non-hierarchical search system. A user must click repeatedly to scroll lists, to move down a page or to change pages in order to find the information they are looking for. People have the capacity to look at choices much faster than the choices are presented by these displays. As more users search more and larger sources of online information, there is a tremendous loss of time waiting for computer displays to catch up with the human ability to scan and select.

The relative slowness of presenting search terms is not a function of search speed or communication speed. Computer hardware and communication bandwidth is now sufficient for quick interactions. The slowness of search technology is caused mainly by inadequate user-interface technology.

A method for rapidly locating pages on a web site is shown, for instance at www.sherwin.com, which is operated by The Sherwin-Williams Co. The site describes products and services offered by The Sherwin-Williams Company. One page, Products and Services, at www.sherwin.com/productsservices/default.asp, shows several menus and sub-menus that function as hyperlinks to other pages within the Sherwin-Williams website. Sub-menus that are not initially visible are displayed when a cursor is moved over a displayed menu items, which is referred to as a "mouse over". The display makes hyperlinks within it's website available quickly, in a relatively small amount of space.

However, the Sherwin-Williams website is not a search site and is not used to search a database or other information source. The site provides hyperlinks to individual pages within the Sherwin-Williams website. When a user has made one choice on sherwin.com/productsservices/default.asp, a different page is displayed and no additional choices are possible.

With the Sherwin-Williams technology, a user cannot access information from a database of information. A user cannot make successive choices to refine their selection as they would with a Directory or non-hierarchical search. When the user selects any hyperlink, the user is then presented with a different page. The different page does not offer any menu choices as on the Services and Products page. There is no database search function associated with the display on the Sherwin-Williams site.

Accordingly, there is a need to facilitate and speed up the presentation and selection of search technologies. This, in turn, will substantially increase the commercial value and practicability of online searching.

SUMMARY OF THE INVENTION

It is an object of the present invention to reduce the amount of time needed to display and select search terms from any user-interface that displays search terms. It is an object of the invention to eliminate or minimize features that add unneeded complexity to a display. This includes eliminating the use of scroll bars, task bars and graphics that must be clicked to signal page reorganization or page changes. It is also an object of the present invention to eliminate the need for any mechanical activity on the part of the user that interferes with the users ability to scan large numbers of search terms and select search terms quickly.

Users may scan and select quickly without the need to interpret a variety of icons and instructions and without the need to perform more than the minimum number of physical actions. The user is not slowed down by pick boxes, scrolling pages, scrolling lists of hyperlinked terms or selecting functions from a task bar, as required by conventional systems.

These goals are achieved by presenting search terms that are meaningfully organized and then advancing the display of choices when a mouse or other pointing device passes over specific parts of the display screen. The display changes quickly to reveal different or additional search terms. If the user wants a list that is displayed to be removed from the visual display, the user simply moves the pointing device to a "blank" area of the display screen.

The present invention reduces, and almost eliminates, the clicking, scrolling and page reorganization that has been required by search directories and non-hierarchical search systems heretofore. Hence, mechanical actions and unnecessary decision making that slow the selection of search terms are eliminated. The display of graphics is simplified so the user's attention is not distracted from the process of scanning and quickly selecting search terms.

DETAILED DESCRIPTION OF THE PREFERRED EMBODIMENTS

In describing a preferred embodiment of the invention, specific terminology will be resorted to for the sake of clarity. However, the invention is not intended to be limited to the specific terms so selected, and it is understood that each specific term includes all technical equivalents that operate in a similar manner to accomplish a similar purpose.

As user herein, the phrase, "search term" generally refers to any word, symbol or phrase that can be selected by a user. Search terms are used to search electronic information for the purpose of identifying and locating parts of information of interest to the user. The word "category" generally is used to refer to a group of search terms that are logically related. In some situations, the category name itself may also be a search term.

A display device is a computer, television terminal, handheld electronic device or any implement that allows a user to interact with a visual representation of an information source. A pointing device is a cursor, track ball, touch pad, pen light or other implement used to interact with iconic images and information displayed on a display device. An information source may be original information, in the form of a database or other collection of records, or it may be a secondary source that reorganizes original content in order to make it easier to search and retrieve information. When there are large quantities of information, the information is preferably stored on a server.

The system and method of the present invention is implemented by computer software that permits the accessing of data from an electronic information source. The software and the information in accordance with the invention may be within a single, free-standing computer or it may be in a central computer networked to a group of other computers or other electronic devices. The information may be stored on a computer hard drive, on a CD ROM disk or on any other appropriate data storage device.

Figure 1:
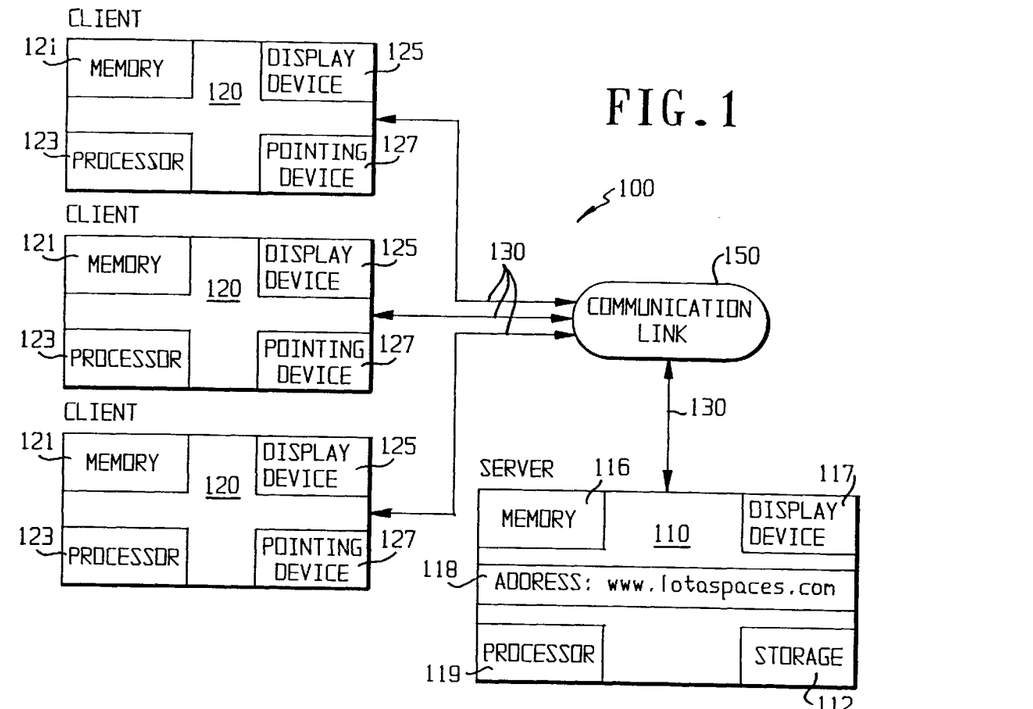
FIG. 1 shows a general configuration of a computer network used in accordance with the present invention.

FIG. 1 shows a simplified representation of a preferred overall implementation of the invention in a computer network 100 in accordance with the preferred embodiment. A plurality of client computers 120 are networked to a remotely located server 110 by a communication link 150 and bi-directional communication lines 130.

Client computers 120 contain, at a minimum, memory 121, processing capability 123, a display device 125 and a pointing device 127. The server contains at a minimum, storage capacity 112, memory 116 and processing capability 119. As a practical matter, the server also has a display device 117 and a keyboard (not shown).

The Communication Link 150 and the communication lines 130 provide two way communication between clients 120 and the server 110. The link is established when a client 120 accesses the server at its electronic address 118. This is done, for example, by entering the Internet address of the server 118 using any Web Browser software.

Programing language may be imbedded in the Browser to allow some of the processing required by the invention to be done on the client rather than having all of the programming done on the server. JavaScript, which was developed by Netscape Communications Corporation, is a well known language used to embed programming code into html documents. In addition, memory space 116 is optionally allocated so that server 110 may retain the status of search requests generated by individual computers 120 during any individual search session.

Figure 2A:
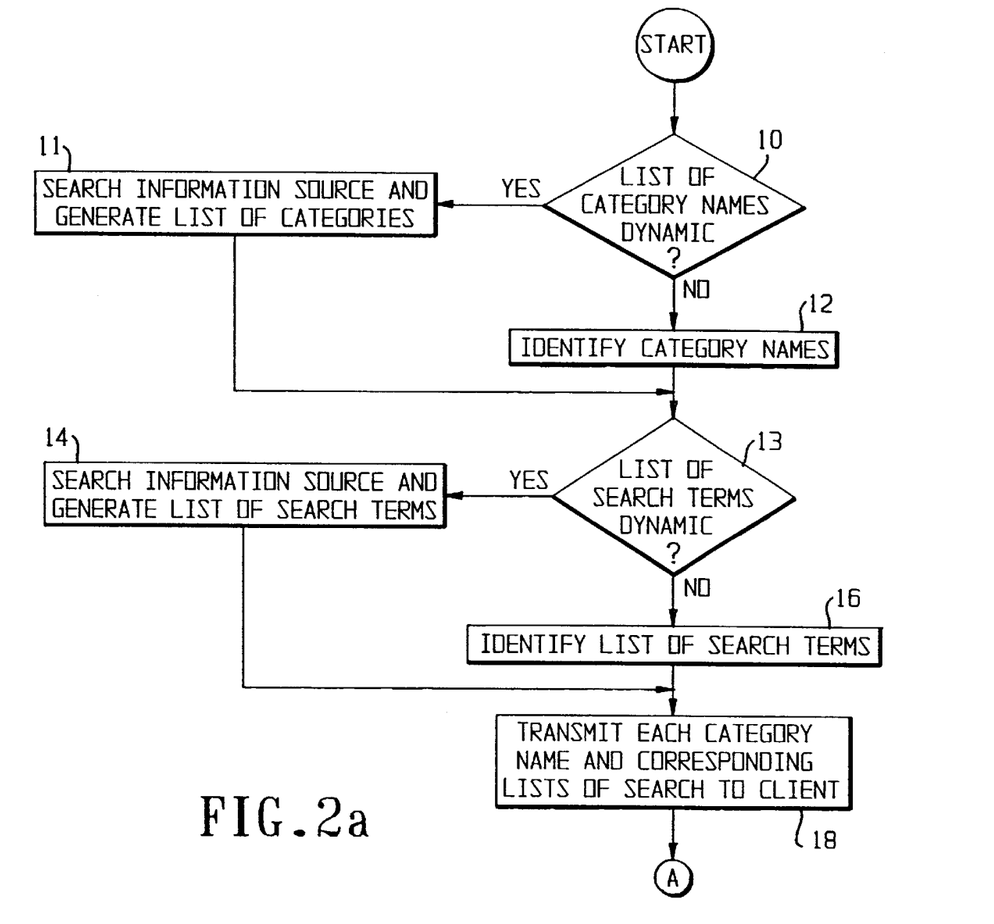
FIGS. 2a–2c are flow charts showing the decision rules for implementing the invention.
Figure 2B:
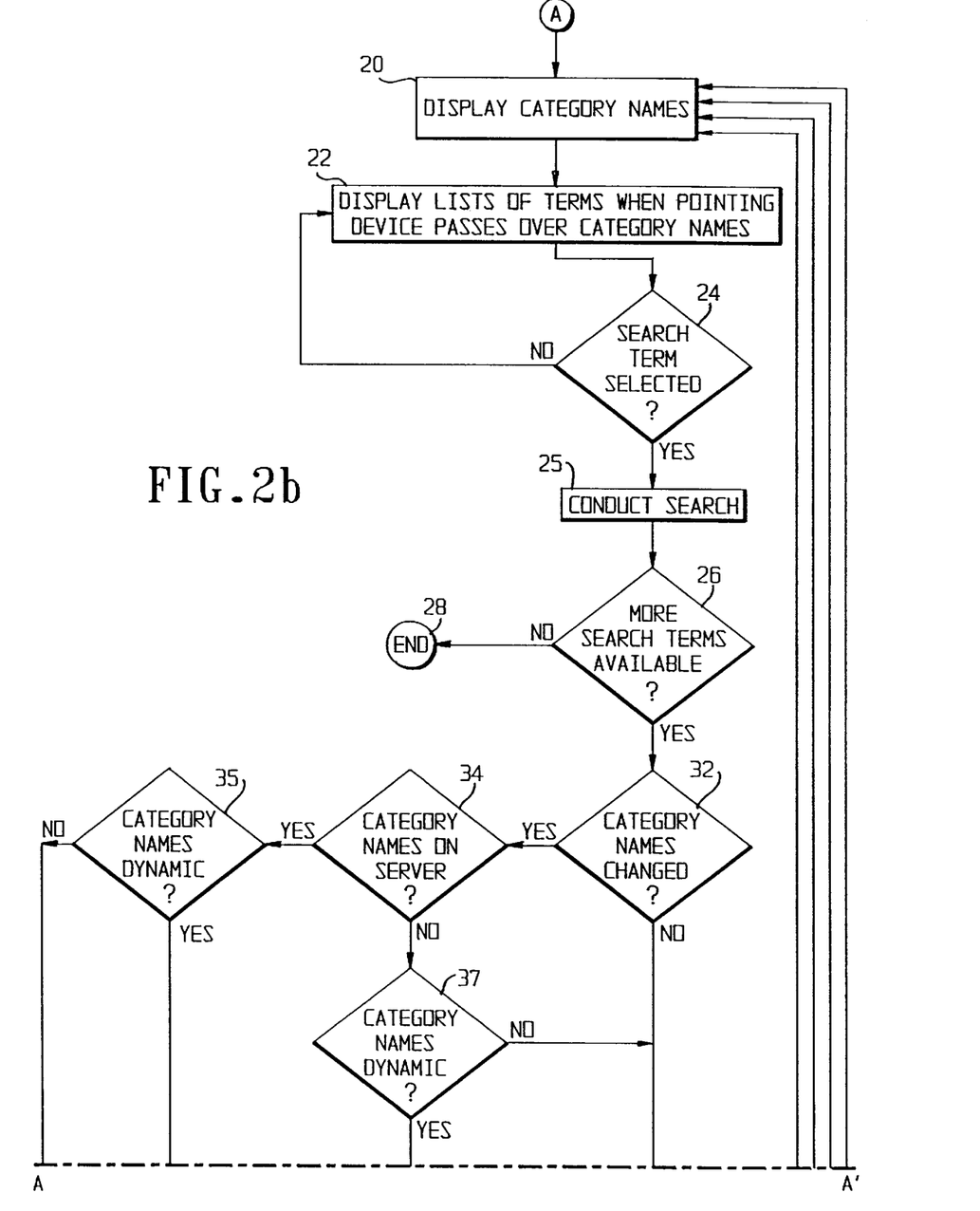
Figure 2C:
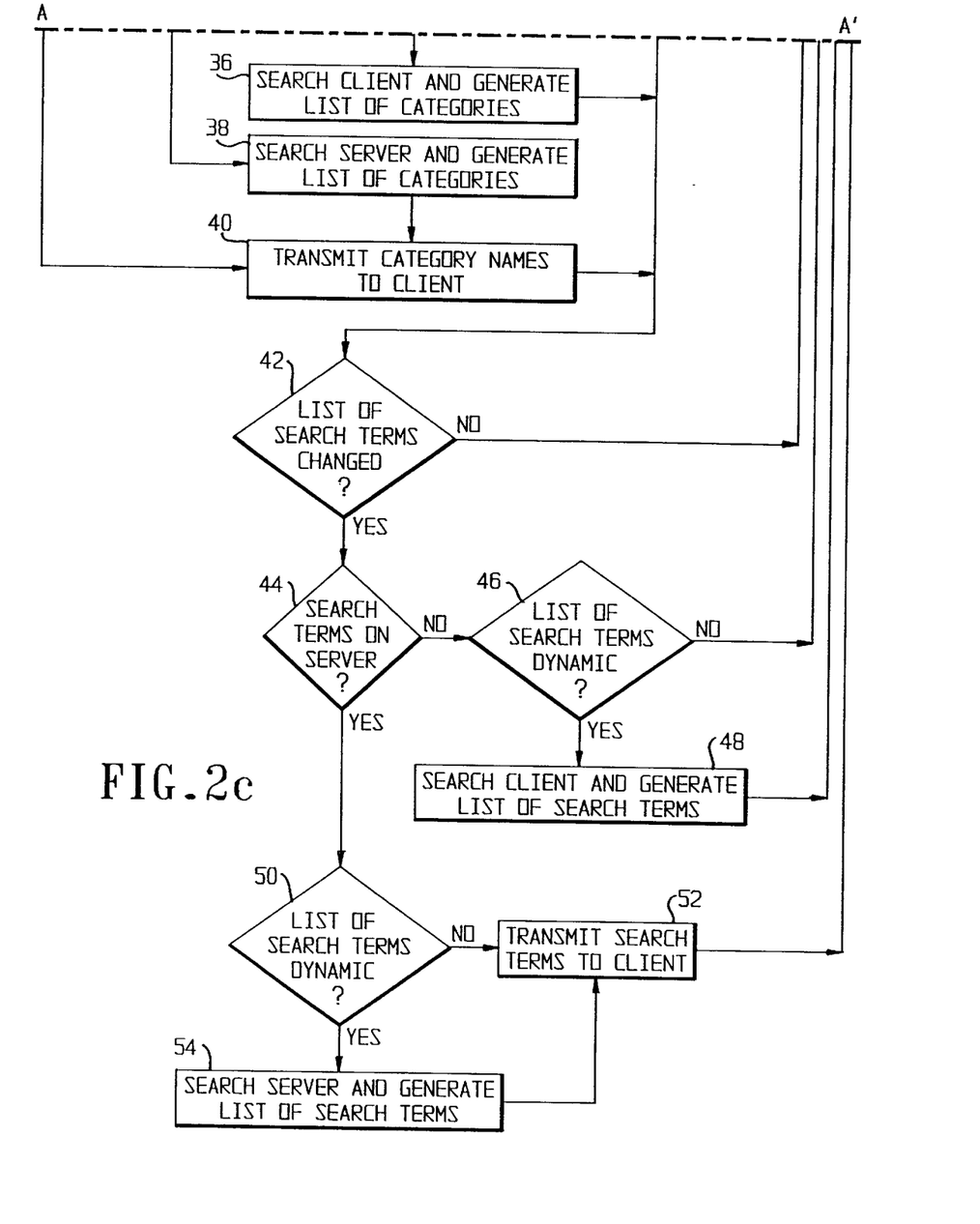

FIGS. 2a–2c are a generalized overall method of finding information from an electronic information source in accordance with the preferred embodiment of the invention. For illustrative purposes specific examples will be discussed with respect to FIGS. 3–12.

Category Names can be generated as either static or dynamic lists 10. If they are dynamic ("yes" at 10), a search is made of the information source and a list of search terms is generated 11. If the first list of Category Names exists as a static list ("no" at 10), the Category Names are identified 12.

Initial lists of Search Terms for each category may be static or dynamic 13. If they are dynamic, a search is made of the information source and a list of terms is generated 14. IF the first list of search terms exist as a static list, the search term lists are identified 16. Category Names and lists of Search Terms associated with each Category Name are sent to the client 18 along with graphics and other information needed to display the page on which the search for information is to take place. Embedded programming code may also be sent to the client.

Continuing with FIGS. 2b and 2c, Category names are displayed with graphics and other information 20. Search Terms are displayed when the pointing device passes over a Category Name 22. The search terms are displayed quickly, using "mouse overs" to test the position of the pointing device. That is, when the pointing device is passed over a Category Name, the list of search terms appears on the screen "automatically". It is not necessary to activate the pointing device by, for example, clicking a cursor in order to display the list of search terms. Lists change when the pointing device is moved to cover any Category name. If the pointing device is not over a Category Name, no list is displayed.

To select a term and proceed ("yes" at 24), it is necessary to activate the pointing device 24. If a cursor is being used, the left button of a cursor is clicked on one of the terms to select that term. Activating the pointing device results in a search of the information source 25. There may be no more search terms from which to choose ("No" at 26) and the program is finished 28.

However, in more complex situations, additional choices are possible ("Yes" at 26). If the search design is hierarchical, as is the case with a Directory, Category Names are likely to change ("Yes" at 32), because, by definition, Directories narrow the range of choices by moving to smaller and smaller divisions of the domain. Those divisions have different sub-category names. If the design is non-hierarchical, Category Names are not likely to change ("No" at 32) because in a non-hierarchical search, the search terms are reduced without necessarily changing the categories.

If Category Names change ("Yes" at 32), a new list of Category Names is generated. At step 34 the program determines whether the Category Names are at the server, or the client and whether they are static or dynamic 35, 37. If they are dynamic, the new list of Category Names is then generated at the server 38 or the client 36. If the Category Names are generated at the server, they are transmitted to the client 40. If Category Names do not change ("No" at 32) the program examines the status of the search terms 42 and proceeds.

Lists of Search Terms may not change ("No" at 42), in which case the user may select again 24. However, lists of Search Terms often do change ("Yes" at 42). New lists of Terms may be generated on the sever ("Yes" at 44) or the client ("No" at 44). At steps 46 and 50, the system determines whether the Search Term lists are dynamic or static. If lists are dynamic, a search will be required 48, 54. If the new Terms are generated on the server, they are transmitted to the client 52. All list of new terms are ultimately available to the user 22.

This design provides maximum flexibility for search situations. The system may be used with hierarchical Directories and non-hierarchical search systems. The system may also be implemented as a server-based system, as a client-based system or as a combination of both.

Users can manipulate the search process multiple times, very quickly, until the desired information is identified. Once a term is available ("Yes" at 26), every path in the flow chart returns to display Category Names and/or Lists 20, 22. Terms will be displayed rapidly in a small amount of space without repositioning the screen display.

Figure 3:
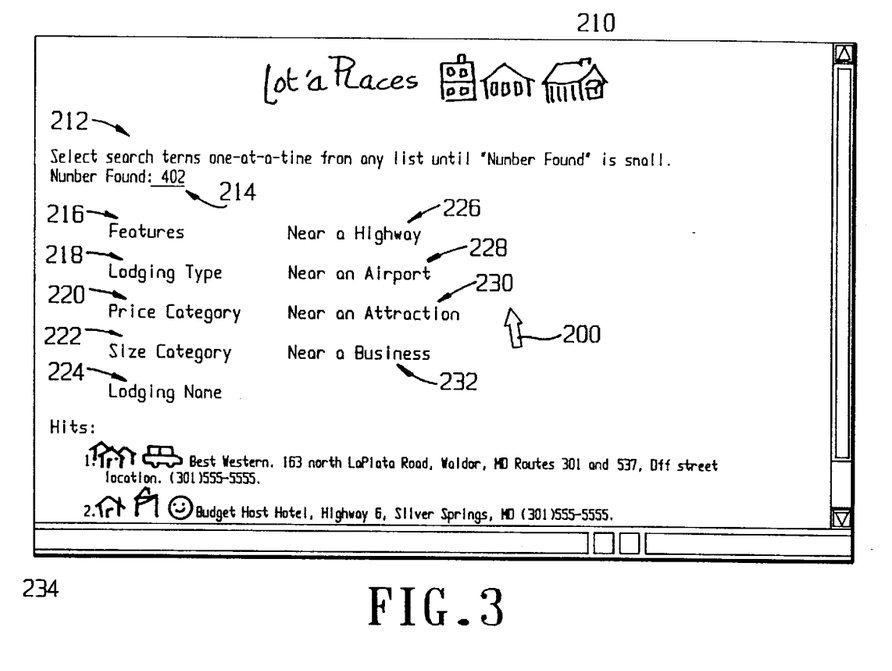
FIG. 3 shows a preferred embodiment of the invention, an online database for searching a lodging database.

FIG. 3 shows a preferred embodiment of the current invention, a non-hierarchical search system for finding lodging locations in the United States. FIG. 3 is a second display at a web site named Lot'a Places (www.lotaplaces.com). Prior to seeing the display in FIG. 3, a user selected from a page that presented choices about the location of the lodging.

In the example that is used here, the state of Maryland was selected on the prior page. Once a State is selected, the preferred embodiment identifies static Category Names on the server, steps 11, 12, and Search Term lists. As described below, some lists are static and some dynamic, 13, 14, 16. The Category Names and Search Term lists are transmitted to the client 18 and the Category Names are displayed 20 as shown in FIG. 3. A logo 210, as well as directions 212 of how to proceed, may optionally be displayed.

The number of "hits" or listings in Maryland from which to choose 214 are displayed. Here, the total number of listings for Maryland is 402, as indicated. Nine Category Names appear in two columns 216–232. In this embodiment, 218, 220 and 222 have lists that are static. Each search term that appears in the list is known in advance of the search since the search terms are always the same. The six other lists are dynamic, and thus will be different for New York and other states than they are for Maryland. They are obtained by searching the information source.

The non-hierarchical search system at Lot'a Places is organized so that any of the nine categories can be used to reduce the number of hits from 402 to some smaller number. Near the bottom of the display, the beginning of an alphabetical list of the current hits is displayed 234. (The invention does not require hits 234 to be displayed as searching progresses. As an alternative, hits may only be displayed when requested by the user.) The cursor 200 is on an "empty" part of the screen so that no lists of search terms are displayed.

Figure 4:
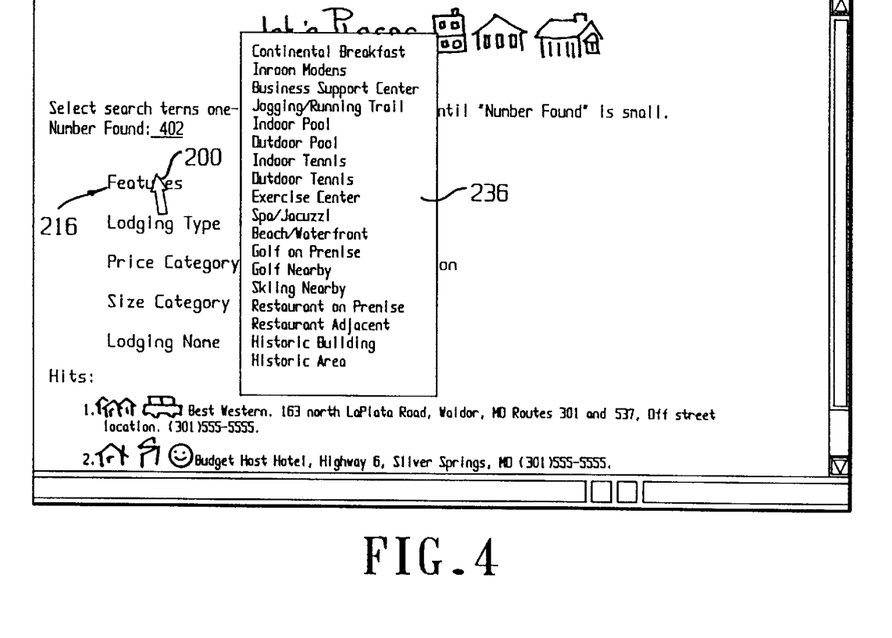
FIGS. 4–6 show the displays of three lists from the lodging database.

FIG. 4 shows the same display when the cursor 200 is passed over the Category Name, Features 216. A list of search terms for the category, Features, is displayed 236, step 22. The search terms are displayed "over" or "on top of" the original html page. Variations in page color or texture can be used to indicate that some material rests "on top of" other material.

If the user moves the cursor to some "empty" place on the display, the list disappears. The user can then put the cursor over another category 218–232 and see another list. Alternatively, the user may click on one of the search terms in the list 24 and execute a search, step 25.

Figure 5:
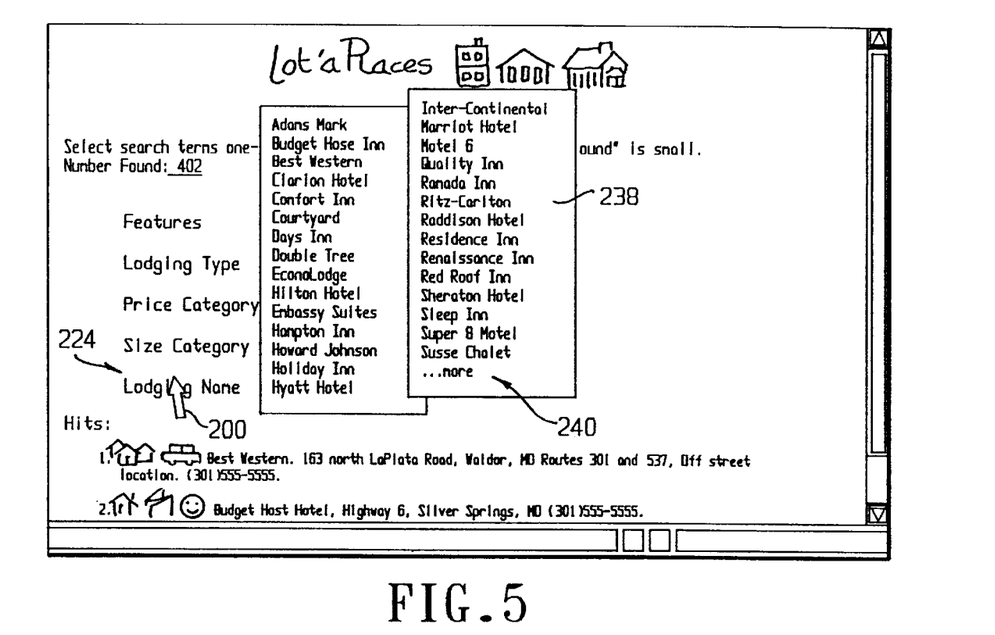

FIG. 5 shows a second list of search terms 238. This list is displayed when the cursor 200 is passed over the category, Lodging Name 224. The list is removed if the user moves the cursor off the category name. FIG. 5 also shows the word "more" in the last position of the second column 240. If the user passes the cursor over this term, additional search terms in the same category are displayed. The use of the "more" option makes large numbers of choices available in a small amount of space at a fastest possible speed. The "more" option may be used multiple times within a list to display multiple pages.

Figure 6:
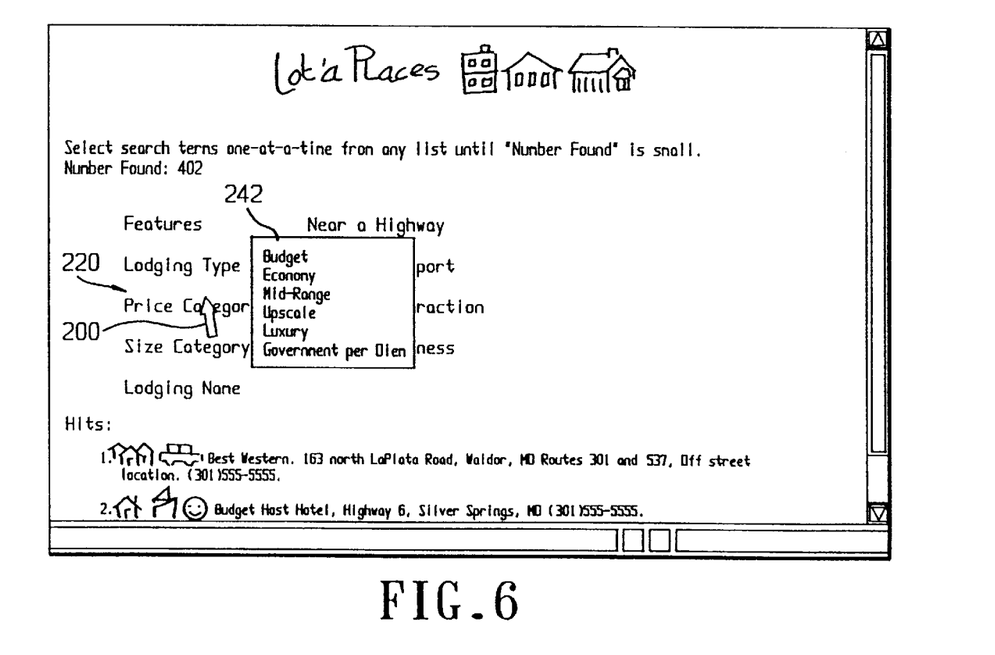
Figure 7:
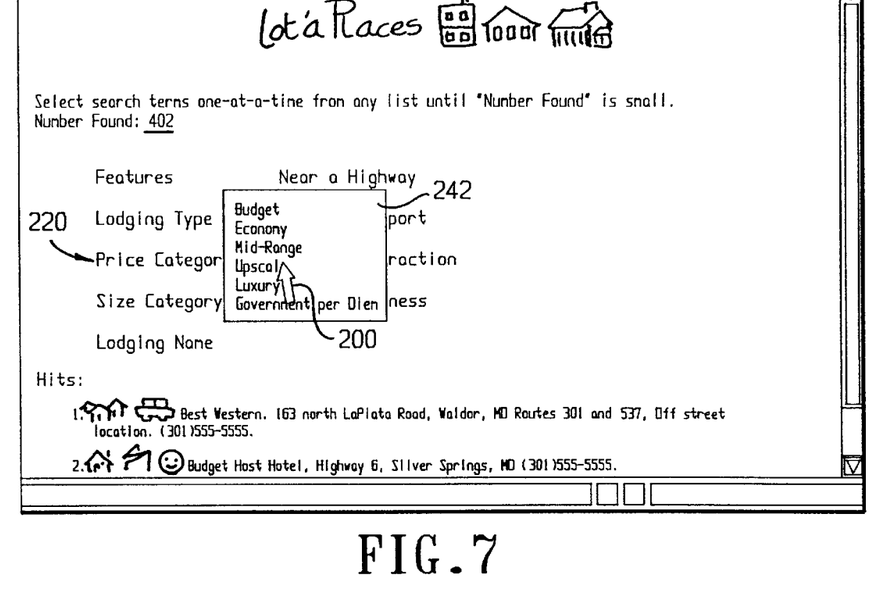
FIG. 7 shows the selection on one of the displayed terms.

FIG. 6 shows a list of Search Terms 242 that is displayed when the cursor 200 is over Price Category 220. FIG. 7 shows the position of the cursor 200 on the list of search terms 242 when it is used to select the search term, Upscale, from the Price Category 220.

Figure 8:
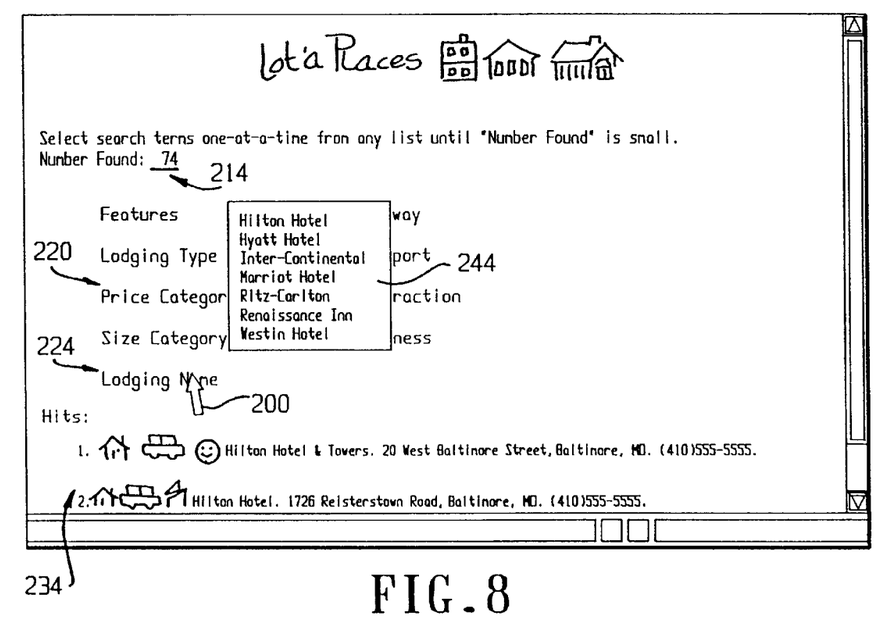
FIG. 8 shows the effect of the selection of the term in FIG. 7.

FIG. 8 shows the results of selecting Upscale at step 24 in FIG. 7. A number of changes have taken place. A search of the database was conducted when the term, Upscale was selected, step 25. Instead of there being 402 hits in Maryland, there are now seventy-four hits, as shown at 214. The seventy-four hits that were selected correspond to lodging in Maryland rated with an upscale price (rather than Mid-range or Economy price, for example). The alphabetical list of hits has changed 234 to show only upscale properties.

At this point, the system determines if additional search terms are available amongst the Categories, step 26 and if the Category Names, have changed 32. In this example, Price Category 220 has been muted to show that the category is no longer available for selection during this search. In the present example, search terms are available in each of the remaining (non-muted) Categories 216–218, 222–232. When the cursor 200 is passed over the Category Name, Lodging Name 224, the list 244 is considerably shorter than the list of Lodging Names displayed in FIG. 5. Lodging Names are now only the names in Maryland that are rated with an Upscale price. When the search was conducted as illustrated in FIG. 7, the domain under consideration was reduced from 402 hits to 74 hits and all dynamic lists of search terms were updated.

A distinguishing feature of this invention is the quickness and fluidity of the selection process. This quickness and fluidity can be achieved even when space needed for lists of search terms exceeds the display space of the computer screen. There are no scroll bars and no pick boxes that change the display of search terms on this single, stable page.

"Mouse overs" allows a list to be displayed when the cursor is passed over a Category Name, and is used in the present invention to obtain a quick and stable selection process. In addition, search terms are passed to the client or created on the client, and held in readiness on the client until the user passes the cursor over a Category Name to display a list of Terms. Actual searches of an information source such as a lodging database are planned so that new and additional information will flow to the user at appropriate times during the selection process. The downloading of lists and programming code is balanced to minimize delays experienced by users.

Figure 9:
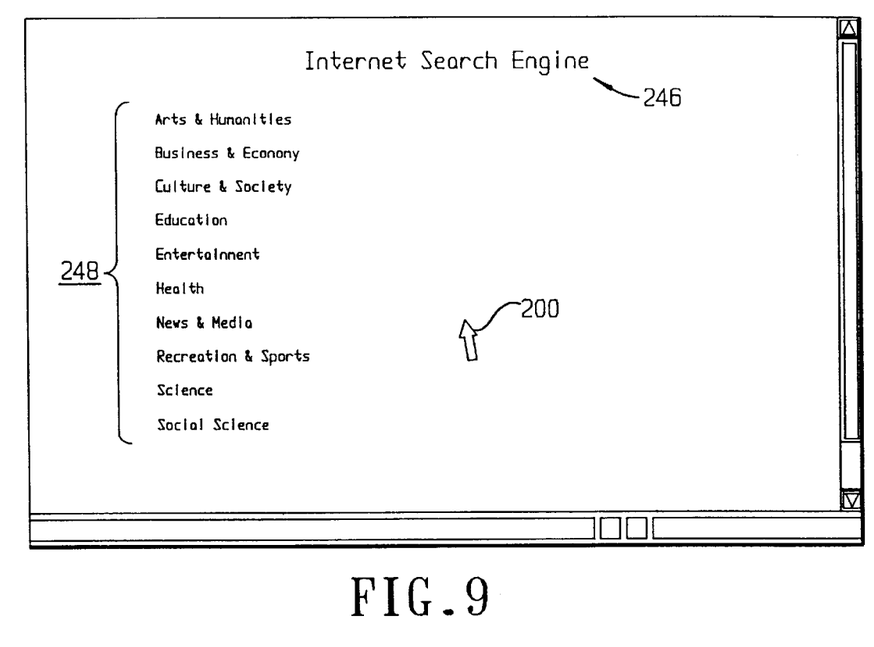
FIG. 9 shows an alternative preferred embodiment of the invention, an Internet Search Engine.

FIGS. 3–8, for the Lot'a Places Lodging search, illustrate the current invention applied to a non-hierarchical search system. FIGS. 9–13, illustrate the use of the current invention when the search system is a hierarchical Directory. FIG. 9 shows the first page of an Internet Search Service. A title 246 appears at the top of the page. Category Names 248 preferably are displayed in a single column on the left side of the page. The cursor 200 is not covering any Category Names. Therefore, no lists of search terms are displayed.

Figure 10:
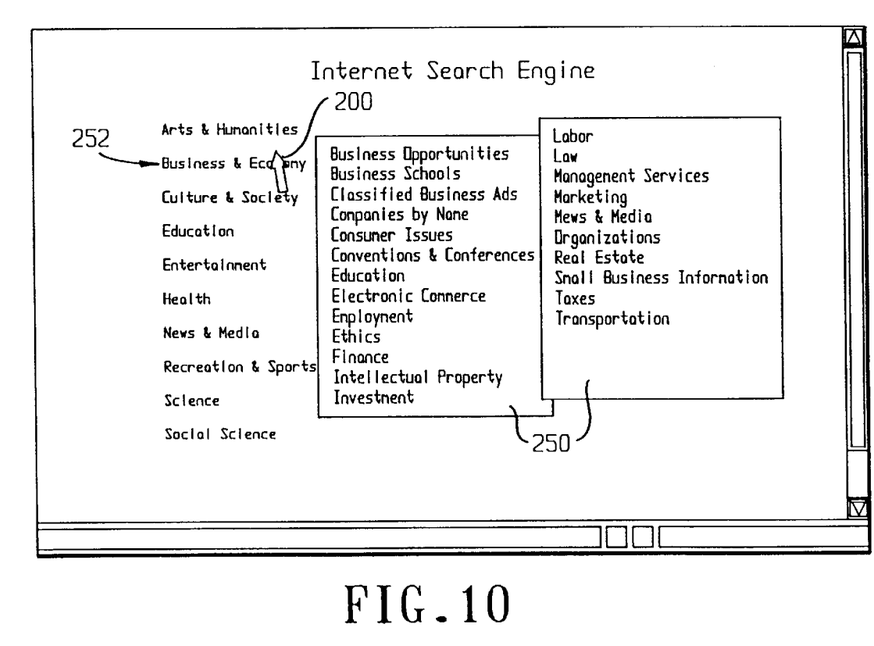
FIG. 10 shows the display of Category Names on the Search Engine.
Figure 11:
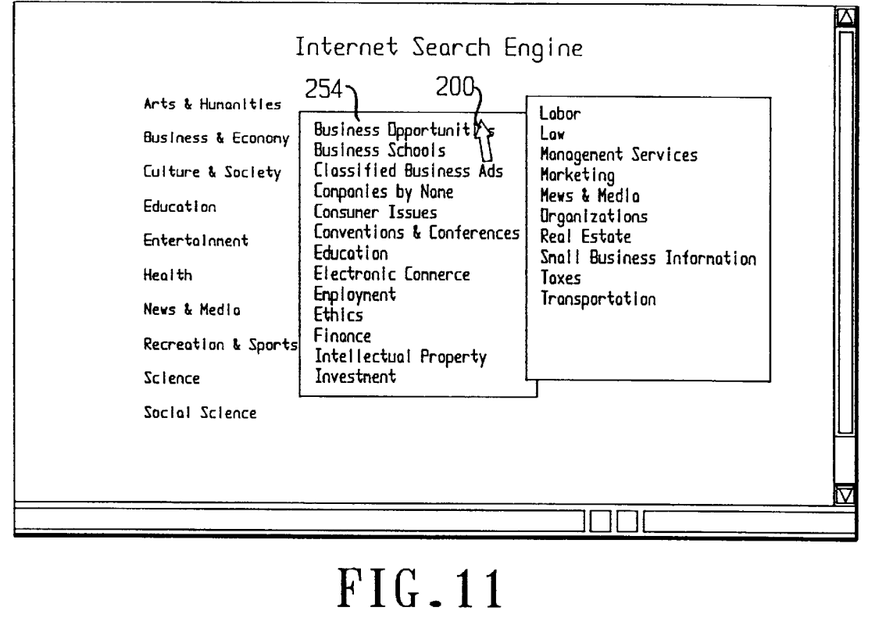
FIG. 11 shows the position of the cursor when selecting a term from a Category.

FIG. 10 shows the list of search terms 250 that are displayed when the cursor 200 is passed over the name, Business & Economy 252. Search terms from any of the other Category Names will be displayed in the same way if the cursor is passed over those names. Lists are all available on the client and can be displayed by moving the cursor to the appropriate position. FIG. 11 shows the position of the cursor 200 as the user selects Business Opportunity 254, the first Search Term in the list.

Figure 12:
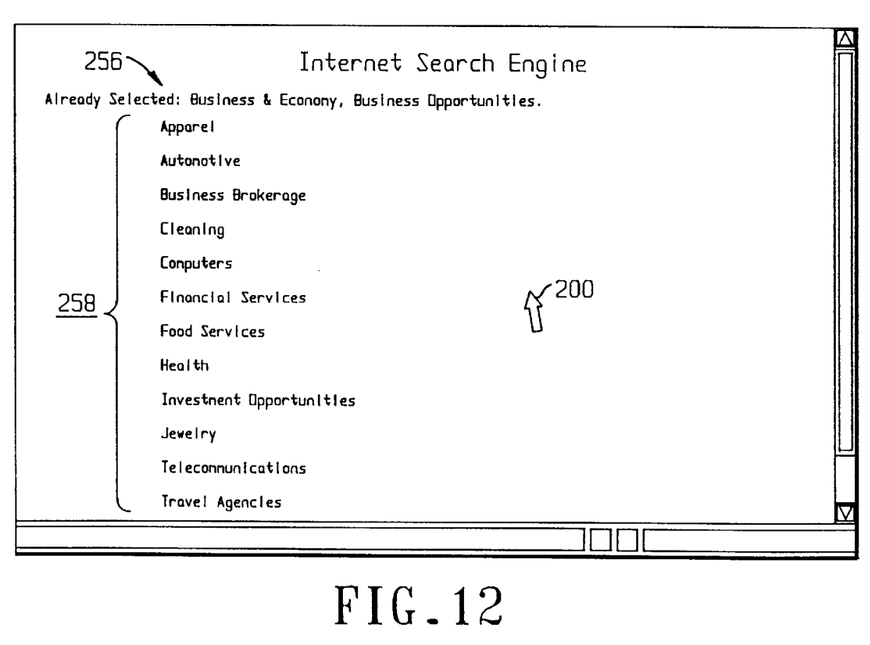
FIG. 12 shows a sub Category list.
Figure 13:
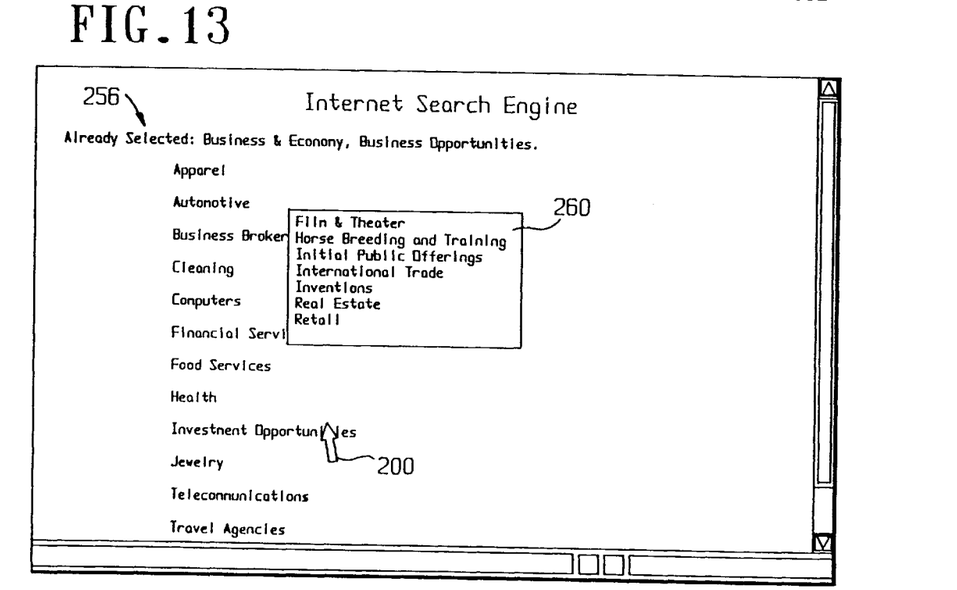
FIG. 13 shows search terms that are displayed after selecting a sub-Category.

FIG. 12 shows the result of clicking on the Search Term, Business Opportunity 254 in FIG. 11. A visual display of the Category and sub-category that was selected is presented at step 256. The search returns another list of Categories 258, which is displayed in place of the list of Category Names in FIGS. 9, 10 and 11. As described in connection with the flow chart, FIGS. 2a and 2b, Category Names sometimes change. In particular, Directories, like the Internet Search Engine in this figure, are likely to create subdirectories of additional Categories as the search process moves down the branches of a Directory tree. In this case, the result of selecting Business Opportunities 254 is a subdirectory that gives names of Business Opportunities. Passing the cursor over these terms may result in other subcategories or it may display a list of hits. FIG. 13 shows the result of passing the cursor over Investment Opportunities in the Business Opportunities sub-category.

Accordingly, non-hierarchical designs (FIGS. 3–8) and Directories (FIGS. 9–13) have different advantages and disadvantages. Yet, both operate more quickly with this new technology. The preferred embodiment uses a Java applet to manage the online display. The applet sets the maximum number of rows to be displayed in each column of search terms. It also sets the maximum number of columns and column width.

The display technique of the present invention may also be implemented for e-commerce purchasing and corporate information systems. In addition, the system may be used in a local computer environment, such as searching files in local storage.

It is not desired to limit the invention to the specific examples shown and described. Rather, all suitable modifications and equivalents may be resorted to, falling within the scope of the invention.

I claim:

1. A method for searching an electronic information source using a display device and a pointing device displayed on the display device, the method comprising:

displaying search category names on the display device;

enabling the user to display a list of search terms associated with a category name by passing the pointing device over any of the displayed category names; and enabling the user to select one of the displayed search terms.

2. The method of claim 1, wherein the pointing device comprises a mouse having a button, and the step of enabling the user to display a list of search terms does not require the user to operate the button.

3. The method of claim 1, further comprising enabling the user to display a different list of search terms by passing the pointing device over a different category name.

4. The method of claim 1, further comprising enabling the user to clear the displayed search terms by moving the pointing device away from the displayed search terms and selected category.

5. The method of claim 1, wherein at least one list of search terms is updated in response to the user selecting one of the displayed search terms.

6. The method of claim 1, wherein the information source is located remote from the display device.

7. The method of claim 1, further comprising searching the information source and retrieving information from the information source in response to said selecting.

8. The method of claim 1, further comprising displaying on the display device an indicator indicating that additional search terms are available that are not displayed on the display device, and enabling the user to display the additional search terms by passing the pointing device over the indicator.

9. The method of claim 1, wherein at least one category name changes in response to said selecting.

10. The method of claim 1, wherein at least one list of search terms is dynamically generated by a search of the information source.

11. The method of claim 9, wherein the category names are arranged in a hierarchical manner.

12. The method of claim 1, wherein successive selections reduce available search terms.

13. The method of claim 1, further comprising searching the information source in response to said selecting.

14. The method of claim 13, wherein said searching is conducted at a client processor.

15. The method of claim 1, wherein at least one category name is updated in response to the selecting.

16. The method of claim 1, wherein a search term comprises any word, symbol or phrase used to search information stored in the electronic information source.

17. The method of claim 1, the electronic information source comprises a travel database.

18. The method of claim 1, wherein the step of enabling the user to display a list of search terms enables the user to pass the pointing device over any of the displayed category names in a non-sequential manner.

19. A method for searching a database on a computer having a display device and a pointing device controlling a cursor displayed on the display device, the database associated with at least one of a plurality of categories of information, at least one category having a sub-category of information, the method comprising:

displaying each category on the display device;

enabling the user to select a category by passing the cursor over one of the displayed categories;

displaying on the display device, in response to the user selecting a category associated with sub-categories, each sub-category of information associated with the selected category;

enabling the user to select a sub-category by passing the cursor over one of the displayed sub-categories;

displaying on the display device, in response to the user selecting a sub-category, a list of search terms associated with the selected sub-category;

enabling the user to select one of the displayed search terms; and, searching the database in response to the selected search term.

20. The method of claim 19, wherein at least one list of search terms is updated in response to the user selecting one of the displayed search terms.

21. The method of claim 19, wherein at least one list of search terms is dynamically generated by a search of the information source.

22. A system for searching a database on a computer from a user terminal including a display device and a manually-operable input unit controlling a cursor displayed on the display device and a select button, the database associated with at least one of a plurality of categories of information, the system comprising:

a computer including a database and a computer processor for accessing the records in accordance with search terms selected at the user terminal:

means for transferring a list of categories and search terms to the display device for simultaneous display of category names associated with each of said categories;

means for enabling the user to select one of the categories by passing the cursor over one of the displayed category names;

means for displaying the search terms associated with the selected category;

means for enabling the user to select one of the displayed search terms; and, means for searching the available records of the database for records responsive to the selected search term.

23. The system of claim 22, wherein at least one list of search terms is updated in response to the user selecting one of the displayed search terms.

24. The system of claim 22, wherein at least one list of search terms is dynamically generated by a search of the database.

25. A website having a user interface for searching a database of records from a user terminal having a display device and a controller for controlling a pointing device displayed on the display device, the website comprising:

category names displayed on the display device;

means for enabling the user to select a category by passing the pointing device over one of the displayed categories;

a list of search terms displayed on the display device in response to the user selecting a category; and, means for enabling the user to select one of the displayed search terms.

26. The website of claim 25, wherein the database is located remote from the user terminal, further comprising means for searching the database in response to the selected search term.

27. The website of claim 25, wherein at least one list of search terms is updated in response to the user selecting one of the displayed search terms.

28. The website of claim 25, wherein at least one list of search terms is dynamically generated by a search of the database.

29. A method for controlling a user interface for searching a database from a computer having a display device and a controller for controlling a pointing device displayed on the display device, the method comprising:

displaying category names on the display device;

enabling the user to select a category by passing the pointing device over one of the displayed categories;

displaying a list of search terms on the display device in response to the user selecting a categories; and, enabling the user to select one of the displayed search terms.

30. The method of claim 29, wherein the method is implemented by a website.

31. The method of claim 29, wherein at least one list of search terms is updated in response to the user selecting one of the displayed search terms.

32. The method of claim 29, wherein at least one list of search terms is dynamically generated by a search of the database.

* * * * *

UNITED STATES PATENT AND TRADEMARK OFFICE
CERTIFICATE OF CORRECTION

PATENT NO. : 6,345,273 B1
DATED : February 5, 2002
INVENTOR(S) : Nancy P. Cochran It is certified that error appears in the above-identified patent and that said Letters Patent is hereby corrected as shown below:

<u>Title page,</u>
Item [56], please add the following patents:
-- References Cited
U.S. PATENT DOCUMENTS

| | | |
|---|---|---|
| 5,768,581 | 6/16/98 | Cochran |
| 5,206,949 | 4/27/93 | Cochran et al. |
| 4,879,648 | 11/7/89 | Cochran et al. |

OTHER REFERENCES
The Sherwin-Williams Company web site, www.Sherwin.com/productsservices/default.asp, 3 pages (undated)

The George Washington University website, www.gwu.edu, 10 pages © 1999, last modified September 7, 1999.

Samos, "SamosMENU", September 28, 1999, http://www.javaboutique.internet.com/SamosMenu/

Signed and Sealed this

Fourth Day of June, 2002

*Attest:*

*Attesting Officer*

JAMES E. ROGAN
*Director of the United States Patent and Trademark Office*